United States Patent
Koh et al.

(10) Patent No.: US 10,274,626 B2
(45) Date of Patent: *Apr. 30, 2019

(54) WING FOR WIDE TOW OF GEOPHYSICAL SURVEY SOURCES

(71) Applicants: PGS Geophysical AS, Oslo (NO); National University of Singapore, Singapore (SG)

(72) Inventors: Chan Ghee Koh, Singapore (SG); Anders Goran Mattsson, Oslo (NO)

(73) Assignees: PGS Geophysical AS, Oslo (NO); National University of Singapore, Singapore (SG)

( * ) Notice: Subject to any disclaimer, the term of this patent is extended or adjusted under 35 U.S.C. 154(b) by 124 days.

This patent is subject to a terminal disclaimer.

(21) Appl. No.: 15/388,461

(22) Filed: Dec. 22, 2016

(65) Prior Publication Data

US 2017/0102473 A1   Apr. 13, 2017

Related U.S. Application Data

(63) Continuation of application No. 13/800,259, filed on Mar. 13, 2013, now Pat. No. 9,551,801.

(51) Int. Cl.
   *G01V 1/38* (2006.01)
   *B63B 21/66* (2006.01)

(52) U.S. Cl.
   CPC ............ *G01V 1/3826* (2013.01); *B63B 21/66* (2013.01)

(58) Field of Classification Search
   CPC .............................. G01V 1/3826; B63B 21/66
   USPC ..................................................... 367/16–18
   See application file for complete search history.

(56) References Cited

U.S. PATENT DOCUMENTS

| | | |
|---|---|---|
| 6,002,648 A | 12/1999 | Ambs |
| 6,144,342 A | 11/2000 | Bertheas et al. |
| 6,606,958 B1 | 8/2003 | Bouyoucos |
| 7,404,370 B2 | 7/2008 | Stokkeland |

(Continued)

FOREIGN PATENT DOCUMENTS

| | | |
|---|---|---|
| EP | 0562780 | 9/1993 |
| EP | 2343575 | 7/2011 |

(Continued)

OTHER PUBLICATIONS

Search Report in GB Application No. 1404165.1 dated Aug. 21, 2014, 4 pages.

(Continued)

*Primary Examiner* — Ian J Lobo

(57) ABSTRACT

Techniques are disclosed relating to wide towing of marine survey signal sources. In one embodiment, an apparatus includes a signal source and a wing coupled to the signal source. In this embodiment, the wing is configured to impart a force to the signal source when towed through a body of water by a survey vessel. In this embodiment, the force includes a lateral component and a vertical component. The wing may be configured to impart the force based on a shape of the wing and an orientation of the wing. The wing may extend over at least a third of a length of a keel of the apparatus. At least a majority of a top surface of the wing may be oriented within 20 degrees of parallel to a surface of the body of water. The wing may include a plurality of wing sections.

31 Claims, 5 Drawing Sheets

(56) References Cited

U.S. PATENT DOCUMENTS

| | | |
|---|---|---|
| 7,577,060 B2 | 8/2009 | Toennessen et al. |
| 7,881,153 B2 | 2/2011 | Stokkeland et al. |
| 8,347,805 B2 | 1/2013 | Stokkeland et al. |
| 8,351,294 B2 | 1/2013 | Stokkeland et al. |
| 8,976,623 B2 | 3/2015 | Sudow et al. |
| 9,551,801 B2 * | 1/2017 | Koh .................. G01V 1/3826 |
| 2003/0039170 A1 | 2/2003 | Soreau et al. |
| 2005/0016434 A1 | 1/2005 | Hocquet et al. |
| 2006/0227657 A1 | 10/2006 | Tveide et al. |
| 2008/0019214 A1 | 1/2008 | Pramik |
| 2008/0205192 A1 | 8/2008 | Keskes et al. |
| 2009/0003129 A1 | 1/2009 | Stokkeland et al. |
| 2010/0214869 A1 | 8/2010 | Toennessen |
| 2011/0149681 A1 | 6/2011 | Hovland et al. |
| 2011/0286303 A1 | 11/2011 | Paull et al. |
| 2012/0002502 A1 | 1/2012 | Hillesund et al. |
| 2012/0257474 A1 | 10/2012 | Cambois et al. |
| 2013/0010571 A1 | 1/2013 | Sudow et al. |
| 2013/0039148 A1 | 2/2013 | Langeland |
| 2013/0051175 A1 | 2/2013 | Boberg et al. |
| 2013/0182531 A1 * | 7/2013 | Gagliardi ............. G01V 1/3826 367/16 |

FOREIGN PATENT DOCUMENTS

| | | |
|---|---|---|
| EP | 2639601 | 9/2013 |
| EP | 2759853 | 7/2014 |
| FR | 8003040 | 9/2014 |
| GB | 2400662 | 10/2004 |
| GB | 2424950 | 10/2006 |
| GB | 2492642 | 1/2013 |
| GB | 2499397 | 8/2013 |
| WO | 0247968 | 6/2002 |

OTHER PUBLICATIONS

Examination Report in GB Application No. 1404165.1 dated Nov. 11, 2016, 6 pages.
Examination Report in Australian Application No. 2014201399 dated Jul. 3, 2017, 3 pages.
Examination Report in GB Application No. 1404165.1 dated Jan. 26, 2017, 2 pages.
Preliminary Search Report in France Application No. 1452109 dated Mar. 16, 2017, 11 pages.

* cited by examiner

600

```
Determine desired lateral component and desired vertical component of a
force to be imparted by a wing coupled to a towed signal source
610
```
↓
```
Adjust an orientation of the wing to achieve the desired lateral component
and desired vertical component
620
```

*Fig. 6*

WING FOR WIDE TOW OF GEOPHYSICAL SURVEY SOURCES

The present application is a continuation of U.S. application Ser. No. 13/800,259, filed Mar. 13, 2013; the disclosures of each of the above-referenced applications are incorporated by reference herein in their entireties.

BACKGROUND

Marine geophysical surveys are often used for oil and gas exploration in marine environments. Various types of signal sources and sensors may be used in different types of geophysical surveys. For example, seismic surveys are based on the use of sound waves. In such a survey, a vessel may tow an acoustic source (e.g., an air gun or a marine vibrator) and a plurality of streamers along which a number of sound sensors (e.g., hydrophones or geophones) are located. Sound waves generated by the source may then be transmitted to the earth's crust and then reflected back and captured at the sensors. Sound waves received during a seismic survey may be analyzed to help locate hydrocarbon-bearing geological structures, and thus determine where deposits of oil and natural gas may be located. As another example, electromagnetic (EM) surveys may be conducted using EM signals transmitted by a submerged antenna and detected by EM receivers.

U.S. Patent Application Publication No. 2012/0257474 entitled "Method for Seismic Surveying using Wider Lateral Spacing between Sources to Improve Efficiency," which is incorporated by reference herein, discloses some advantages of wide lateral spacing of towed signal sources.

BRIEF DESCRIPTION OF THE DRAWINGS

FIG. 6 is a flow diagram illustrating one embodiment of a method for adjusting a lateral displacement of a signal source.

Figure 1:
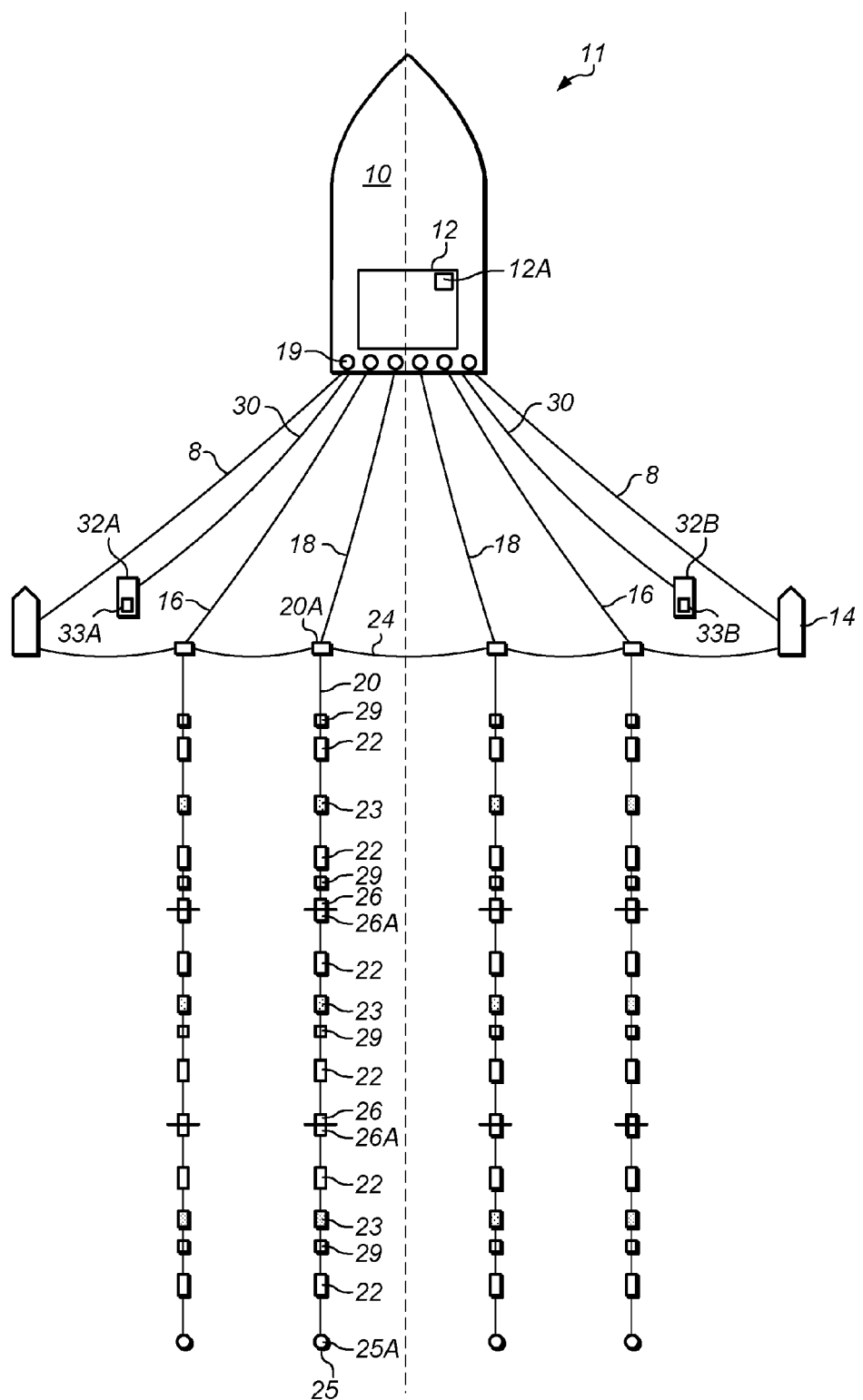
FIG. 1 is a diagram illustrating one embodiment of a marine survey system.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component.

As used herein, the term "based on" is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but does not foreclose the determination of A from also being based on C. In other instances, A may be determined based solely on B.

DETAILED DESCRIPTION

The present disclosure describes embodiments in which one or more signal sources are towed behind a survey vessel, often in conjunction with one or more streamers. As used herein, the term "signal source" refers to an apparatus that is configured to emit a signal (e.g., acoustic, electromagnetic, etc.) into a body of water that interacts with one or more structures underlying the body of water and then measured as a response signal. As used herein, the term "streamer" refers to an apparatus that includes detectors, sensors, receivers, or other structures configured to measure the response signal (e.g., by using hydrophones, electrodes, etc. that are positioned along or in proximity to the streamer). As will be described below, in various embodiments, a signal source may include a wing or deflector that permits the signal source to be steered (e.g., active, passive, or automated direction control) laterally and/or vertically. In some embodiments, the wing is configured to impart a force that includes a vertical component, which may reduce or eliminate the need for floatation devices for the signal source. The force may also include a lateral component which may allow for lateral separation between towed signal sources of at least 600 meters in some embodiments.

As used herein, the terms "vertical" or "vertical component" of a force refer to a direction or a component in a direction that opposes the force of gravity and operates in the direction of any buoyant force acting on the object. For example, the vertical component of a force acting on a submerged object is directed toward a surface of the body of water in which the object is submerged. Further, the terms "lateral" or "lateral component" of a force refer to a direction or a component in a direction generally directed sideways relative to a direction of travel of an object. When used in the context of an object towed by a vessel, "lateral" refers to a direction transverse to the direction of travel of the vessel, while "forward" refers to the direction of travel of the vessel, and "aft" refers to the direction opposite the direction of travel of the vessel.

Referring to FIG. 1, a diagram shows one embodiment of a marine geophysical survey system that includes towed signal source modules 32. The geophysical survey system includes survey vessel 10 that moves along the surface of body of water 11 such as a lake or the ocean. In the illustrated embodiment, survey vessel 10 tows streamers 20, signal source modules 32, and paravanes 14. In other embodiments, streamers 20 are towed by a second survey vessel (not shown), rather than survey vessel 10. Survey vessel 10 may include equipment, shown generally at 12 and for convenience collectively referred to as "survey equipment." Survey equipment 12 typically includes devices such as a data recording unit (not shown separately) for making a record with respect to time of signals generated by various sensors in the acquisition system. Survey equipment 12 also typically includes navigation equipment (not shown separately), which may be configured to control, determine, and record, at selected times, the geodetic positions of: survey vessel 10, each of a plurality of geophysical sensors 22 disposed at spaced-apart locations on streamers 20, and/or signal source modules 32. Geodetic position may be determined using various devices, including global navigation satellite systems such as the global positioning system (GPS), for example. In the illustrated embodiment, survey vessel 10 includes geodetic positioning device 12A, and signal source modules 32A and 32B respectively include geodetic positioning devices 33A and 33B.

Signal source modules 32A and 32B may be any type of signal source known in the art and may be referred to collectively as signal source modules 32. Each signal source module 32 may include an array of multiple signal sources. For example, signal source module 32A may include a plurality of air guns. The term "signal source" may refer to a single signal source or to a module that includes a plurality of signal sources. In various embodiments, a survey system may include any appropriate number of towed signal source modules 32.

In the illustrated embodiment, signal source modules 32 are each coupled to survey vessel 10 at one end through winch 19 or a similar spooling device that enables changing the deployed length of each signal source cable 30. In some embodiments, survey vessel 10 is configured to tow signal sources at a wide lateral displacement (i.e., wide towing). For example, an operational lateral displacement between the two signal source modules 32 may be between about 200 meters and about 600 meters, or even greater than 600 meters. As another example, the operational lateral displacement between signal source module 32A and a point at which signal source cable 30 is coupled to survey vessel 10 may be greater in magnitude than one half of a length of signal source cable 30. In some embodiments, the operational lateral displacement between signal source modules 32 may be greater than a length of signal source cable 30. Similarly, an operational lateral displacement between signal source module 32A and a center point of survey vessel 10 (illustrated as a dashed line) or between signal source module 32A and a tow point on survey vessel 10 (i.e., where signal source cable 30 is coupled to survey vessel 10) may be between about 100 meters and about 300 meters, or even greater than 300 meters. In other embodiments, various operational lateral displacements may be achieved.

In one embodiment, signal source module 32A includes a wing or deflector configured to impart a force. The force may be imparted based on the buoyancy of the wing, a velocity of towing, a shape of the wing, and/or an orientation of the wing, for example. The wing may be used, for example, to obtain a wider separation between signal source modules 32. The wing may also provide a vertical component of the force to signal source module 32A, which may allow signal source module 32A to remain at a desired depth near the surface with reduced need for a floatation device, or even without any coupled floatation device. The wing may include multiple wing sections. The wing may be constructed using buoyant material(s). The wing may allow for wide towing of signal source modules 32. Survey equipment 12 may include equipment for receiving or determining and then maintaining a desired position of signal source module 32A relative to survey vessel 10. A control system for adjusting the wing may be located in survey equipment 12 on survey vessel 10 or may be included in signal source module 32A, for example.

As used herein, the terms "wing" and "deflector" may be used interchangeably to refer to an element configured to provide force components in various directions by interacting with water when towed through a body of water. A wing may or may not be cambered in order to increase an imparted force. If a wing is cambered, various cambering angles may be implemented in various directions along the wing as appropriate. A wing may include multiple wing sections. Orientations of wing sections may in some embodiments be separately altered in order to alter the wing's overall orientation.

As used herein, the term "orientation" includes any characteristics regarding the geometric arrangement of a wing or deflector. As non-limiting examples, the term "orientation" may include: an angle of a wing relative to some reference axis, the rotation of one or more wing sections, the position of a wing relative to another wing, or the position of a wing when coupled to a given surface of a module.

Geophysical sensors 22 on streamers 20 may be any type of geophysical sensor known in the art. Non-limiting examples of such sensors may include particle-motion-responsive seismic sensors such as geophones and accelerometers, pressure-responsive seismic sensors, pressure-time-gradient-responsive seismic sensors, electrodes, magnetometers, temperature sensors or combinations of the foregoing. In various implementations of the disclosure, geophysical sensors 22 may measure, for example, seismic or electromagnetic field energy primarily reflected from or refracted by various structures in the Earth's subsurface below the bottom of body of water 11 in response to energy imparted into the subsurface by one or more of signal source modules 32. Seismic energy, for example, may originate from signal source modules 32, or an array of such sources, deployed in body of water 11 and towed by survey vessel 10. Electromagnetic energy may be provided by passing electric current through a wire loop or electrode pair (not shown for clarity). Various signal sources may be towed in body of water 11 by survey vessel 10 or a different vessel (not shown). Survey equipment 12 may also include signal source control equipment (not shown separately) for selectively operating and maneuvering signal source modules 32.

In the survey system shown in FIG. 1, survey vessel 10 tows four sensor streamers 20. In various embodiments, survey vessel 10 may tow any appropriate number of sensor streamers, including as few as none or as many as 26 or more. In marine geophysical acquisition systems such as shown in FIG. 1 that include a plurality of laterally spaced-apart streamers, streamers 20 are typically coupled to towing equipment that secures the forward end of each of streamers 20 at a selected lateral position with respect to adjacent streamers and with respect to survey vessel 10. For example, as shown in FIG. 1, the towing equipment may include two paravanes 14 coupled to survey vessel 10 via paravane tow ropes 8. In the illustrated embodiment, paravanes 14 are the outermost components in the streamer spread and may be used to provide lateral streamer separation.

Figure 2:
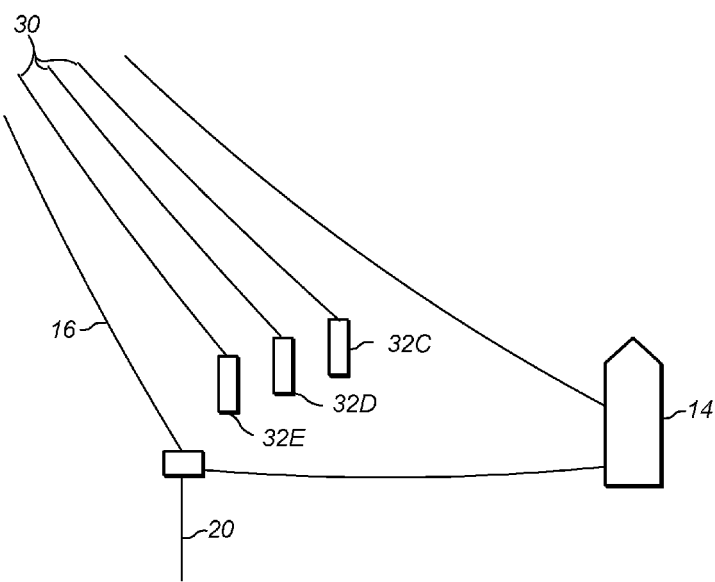
FIG. 2 is a block diagram illustrating one embodiment of a marine survey system with multiple towed signal sources.

Referring now to FIG. 2, a closer view of one embodiment of a system that includes multiple signal source modules 32 is shown. In the illustrated embodiment, signal source modules 32C, 32D, and 32E are towed by respective signal source cables 30 and each include a wing (not shown) configured to impart a force that includes a lateral component and/or a vertical component. A control system on survey vessel 10 or on one or more of the signal sources may be configured to select and maintain a particular lateral displacement for each signal source relative to survey vessel 10 and/or with respect to each other. The control system may be further configured to select and maintain a particular depth for each of the signal source modules 32. The signal source modules 32 may or may not be maintained at the same depth. The lateral displacement and depth of each signal source module 32 may be selected to accommodate various operational factors, such as survey design, weather conditions, towing speed, towing direction, equipment handling parameters, streamer locations, local currents, predicted noise levels, etc.

Figure 3A:
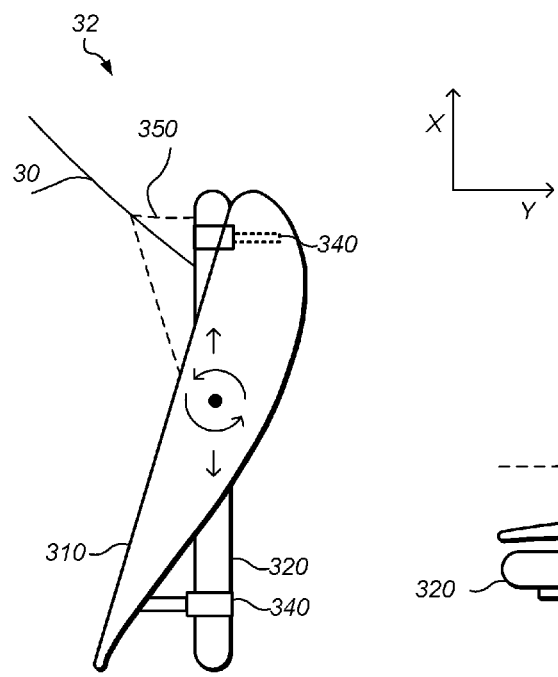
FIGS. 3A and 3B are diagrams illustrating top and side views of one embodiment of a signal source module that includes a wing.

Referring now to FIG. 3A, a diagram shows a top view of one exemplary embodiment of a signal source module 32 that includes a wing. In the illustrated embodiment, signal source module 32 includes wing 310, keel 320, signal source tow cable 30, and actuators 340. In the illustrated embodiment, wing 310 is directly coupled to the top of keel 320 which is directly coupled to signal source cable 30.

As used herein, the term "coupled" refers to a connection between components, whether direct or indirect. For example, in the illustrated embodiment, wing 310 is coupled to signal source cable 30 through keel 320. Further, keel 320 is shown as "directly coupled" to signal source cable 30 because in this embodiment there are no intervening elements.

Wing 310 may be shaped differently in different embodiments. Wing 310 may be configured to impart a force to keel 320 based on shape and/or orientation of wing 310. The force may include both a lateral component and a vertical component. For example, signal source module 32 may be towed through a body of water predominantly in the X-direction, and the lateral force component may be imparted in the Y-direction. In the illustrated embodiment, the vertical component may be directed toward the viewer of FIG. 3A. In the illustrated embodiment, wing 310 is coupled to keel 320 via a fixed pivot point and configured to rotate about the fixed pivot point in order to adjust force components imparted to keel 320 as signal source module 32 is towed through a body of water. In other embodiments, the pivot point may not be fixed, but may be configured to slide along keel 320. The aforementioned control system may control the rotation and/or sliding of wing 310 relative to the signal source module 32 to adjust the force components. In the illustrated embodiment, wing 310 is coupled to the top of keel 320 and is partly parallel to a surface of the body of water through which is it towed in order to impart a vertical component as well as a lateral component of the force.

Figure 3B:
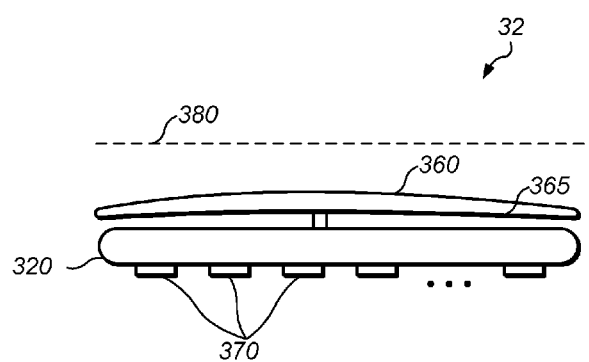

In various embodiments, wing 310 is oriented such that at least a majority of the top surface of wing 310 is nearly parallel (e.g., within 25 degrees of parallel) to a surface of the body of water when towed. For example, FIG. 3B shows a side view of one embodiment of signal source module 32. In the illustrated embodiment, wing 310 is oriented such that much of top surface 360 is within 20 degrees of parallel to the surface of the water (represented by dashed line 380). In other implementations, greater or lesser amounts of the top surface of wing 310 may be substantially parallel to the surface of the water. In the illustrated embodiment, lower surface 365 is curved in the same direction as upper surface 360. In other embodiments, lower surface 365 may be flat or may curve away from top surface 360. In the embodiment of FIG. 3B, signal source module 32 includes a plurality of signal sources 370 arranged in an array.

In various embodiment, wing 310 may be configured to impart a further vertical force to keel 320 using a buoyant force that is based on the material(s) and/or enclosed space included in the wing (e.g., in addition to any vertical components from water pressure acting on the wing caused by the wing being towed).

In the illustrated embodiment, actuators 340 are coupled to keel 320 and to wing 310 and are configured to rotate the wing about the pivot point. For example, actuators 340 may be hydraulic cylinders for pushing/pulling wing 310 as appropriate. In other embodiments, other types or numbers of actuators may be implemented, as desired. Actuators 340 may be configured to rotate and/or slide in position when rotating wing 310. The aforementioned control system may control actuators 340.

In other embodiments, signal source module 32 may not include actuators 340. For example, a circular actuator may be located at the pivot point and may be configured to rotate wing 310 without actuators 340. As another example, a linear actuator may be configured to slide the pivot point along keel 320. In other embodiments, any of various appropriate actuators may be implemented in order to alter the orientation of wing 310 with respect to keel 320. Actuators 340 may in some embodiments be linear or circular.

As used herein, the term "actuator" refers to a unit for moving or controlling an element. An actuator is operated by a source of energy such as electric current or hydraulic or pneumatic pressure, for example. An actuator may cause a circular motion or a linear motion in some embodiments, which may be converted into another type of motion. A "linear actuator" causes linear motion. Thus, in the illustrated embodiment, actuators 340 are linear actuators, and their linear motion is converted into a rotation of wing 310.

Signal source cable 30 may be coupled to any of various appropriate locations on keel 320. In one embodiment, the coupling point is adjustable. For example, the coupling point may be configured to slide through various positions along keel 320 in response to a control signal. As another example, signal source cable 30 may be split into two cables before being coupled to keel 320 (shown as dashed lines 350) and each of the two cables may be coupled to keel 320 via a winch. In this embodiment, adjusting the winches may perform the same function as moving the location of a single coupling point for signal source module 32, resulting in an adjustable "effective tow point" for signal source module 32. Different effective tow points may allow signal source module 32 to retain a desired heading while remaining at a particular lateral displacement. The aforementioned control system may adjust the effective tow point for signal source module 32.

Keel 320 may be implemented using any appropriate structure. In one embodiment, keel 320 is configured to house an array of 12 air guns (not shown), e.g., coupled to the bottom of keel 320. In other embodiments, keel 320 is configured to include or couple to any number of various types of signals sources. Keel 320 may be roughly cylindrical in shape and may include rounded or bulleted ends to reduce drag.

In some embodiments, wing 310 is extends over a significant portion of keel 320. For example, wing 310 may extend over at least a third of the length of keel 320. In the illustrated embodiment, wing 310 is slightly longer than keel 320. In various embodiments, wing 310 may extend over any appropriate portion of the length of keel 320. In one embodiment, keel 320 is also coupled to a floatation device (not shown). In other embodiments, wing 310 is configured to provide a great enough vertical force component to maintain keel 320 at a desired depth (e.g., near the surface of a body of water) without a coupled floatation device.

Figure 4:
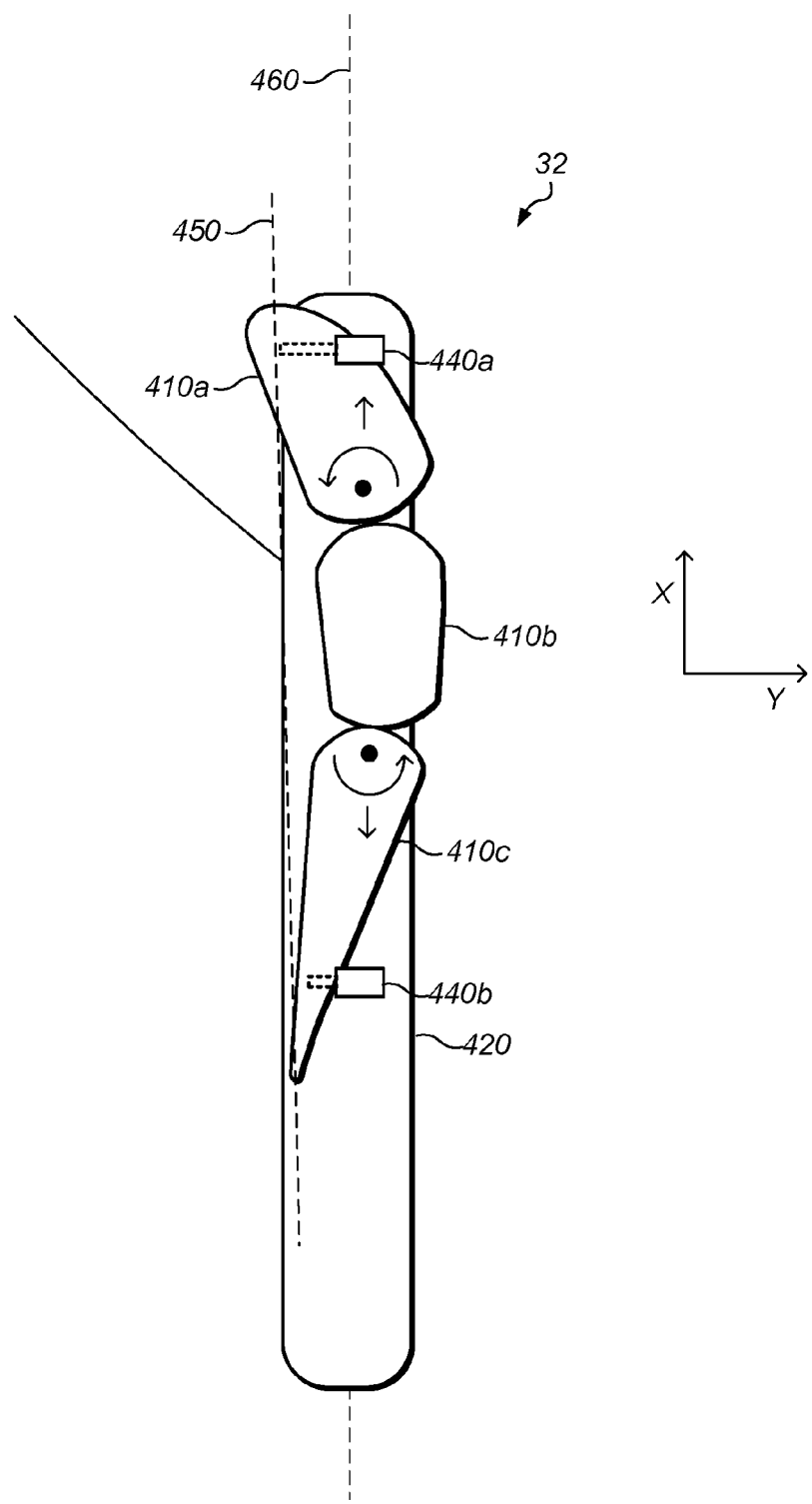
FIG. 4 is a diagram illustrating one embodiment of a signal source module that includes a wing with multiple wing sections.

Referring now to FIG. 4, a diagram shows a top view of one embodiment of a signal source module 32 that includes a wing with multiple wing sections. In the illustrated embodiment, signal source module 32 includes wing sections 410a-c, keel 420, and actuators 440. Keel 420 and actuators 440 may be similarly configured to keel 320 and actuators 340 of FIG. 3A, respectively.

In the illustrated embodiment, wing section 410b is fixed and wing sections 410a and 410c are separately rotatable in order to adjust force components imparted by wing 410. In other embodiments, any appropriate number of wing sections may make up wing 410 and all or a portion of the wing sections may be separately adjustable (e.g., rotatable and/or slidable) in order to adjust force components imparted by a wing. In the illustrated embodiment, actuator 440a is configured to rotate wing section 410a and actuator 440b is configured to rotate wing section 410c. In other embodiments, signal source module 32 does not include actuators 440a and 440b, but includes actuators in other appropriate locations.

In various embodiments, a wing or positioned such that a line drawn through a longest direction of the wing (e.g., dashed line 450 in FIG. 4) is substantially parallel to a centerline of keel 420 (e.g., dashed line 460 in FIG. 4), at least when rotated in a particular way. For example, the line may be within 20 degrees of parallel to the centerline 460 of keel 420. In some embodiments, this orientation may allow for a greater lateral force relative to other orientations.

As used herein, the term "wing section" refers to a portion of a wing that is a separate physical unit from other wing portions. The flaps of an aircraft wing are one example of a wing section. Wing sections of the same wing may physically contact each other or there may be gaps between them. In some embodiments, wing sections are oriented such that they appear to make up a single wing. However, it may be difficult in some instances to determine whether wing sections are separate wings or sections of the same wing. In the embodiment of FIG. 4, wing sections 410a-c are described as sections of a single wing because they appear to make up a wing. In contrast, in the embodiment of FIG. 5, wings 510a-n are described as separate wings and do not appear to make up the same wing. Both embodiments that include multiple wing sections of a single wing and embodiments that include multiple wings are disclosed and contemplated.

Figure 5:
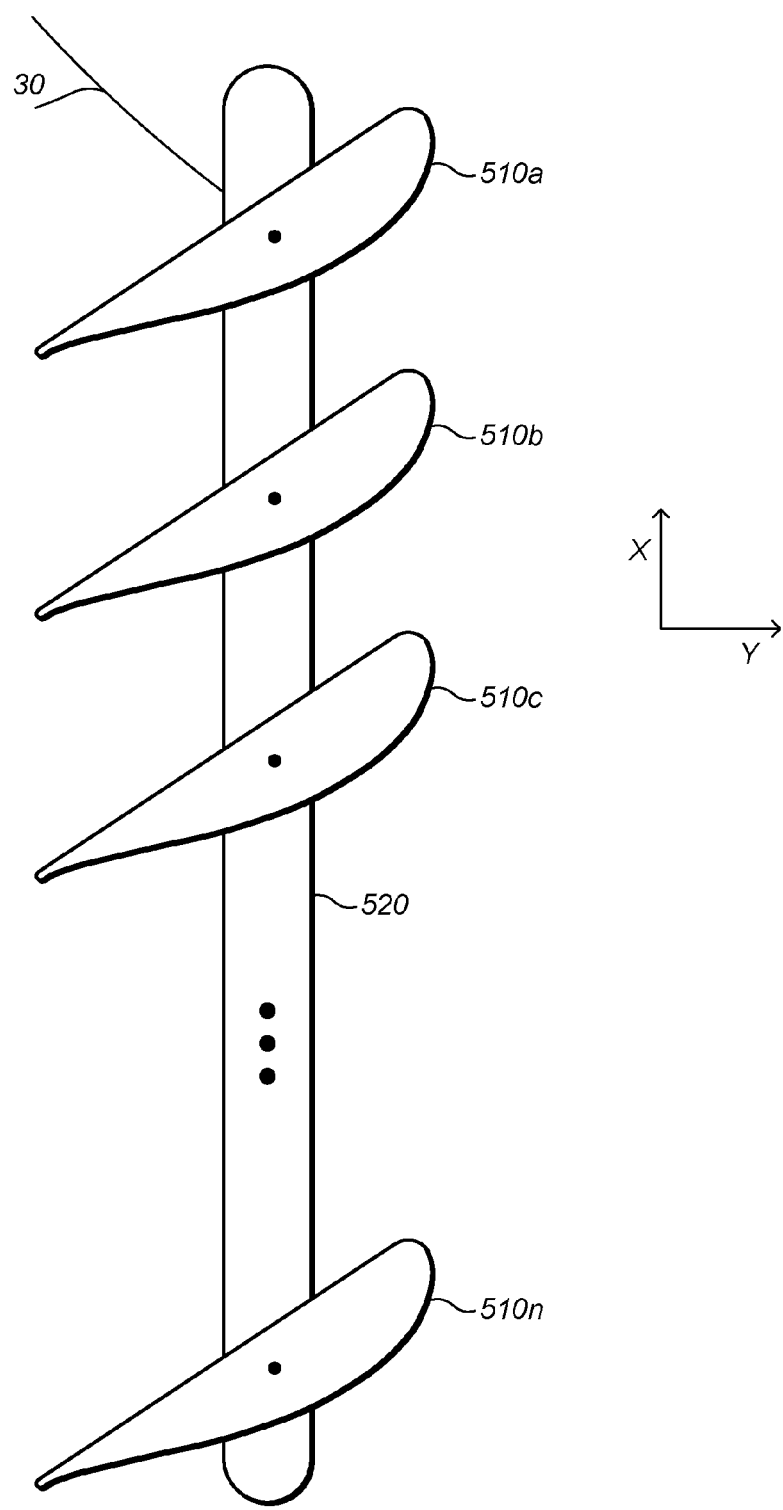
FIG. 5 is diagram illustrating one embodiment of a signal source module that includes multiple wings.

Referring now to FIG. 5, a diagram shows one embodiment of a signal source module that includes multiple wings. In the illustrated embodiment, signal source module 32 includes wings 510a-n and keel 520 and is coupled to signal source cable 30. Any of various numbers of wings may be coupled to keel 520 as desired.

Wings 510 may be configured to impart respective vertical force components (e.g., toward the viewer of FIG. 5) and lateral force components (e.g., in the Y-direction) to keel 520 as it is towed through a body of water (e.g., in the X-direction). These force components may be imparted based on the shape of wings 510 and the orientation of wings 510. In the illustrated embodiment, a control system is configured to adjust the orientation of wings 510 by rotating them about a pivot point and/or sliding the pivot point along keel 520. In embodiments with multiple wings, some of the wings' orientations may be adjustable while others of the wings' orientations may be fixed. In other embodiments, a control system may be configured to adjust wings' orientations by sliding a coupling point of the wings, rotating wings about other axis, etc.

Referring now to FIG. 6, a flow diagram illustrating one exemplary embodiment of a method 600 for adjusting a lateral displacement of a signal source is shown. The method shown in FIG. 6 may be used in conjunction with any of the devices, elements, or components disclosed herein, among other devices. In various embodiments, some of the method elements shown may be performed concurrently, in a different order than shown, or may be omitted. Additional method elements may also be performed as desired. Flow begins at block 610.

At block 610, a desired lateral component and a desired vertical component of a force to be imparted by a wing coupled to a towed signal source are determined. For example, the desired vertical component may be of a magnitude sufficient to maintain a particular depth of the towed signal source. Said another way, the vertical component of the force may be enough (when combined with any other forces such as buoyant forces acting on signal source module 32) to counteract the force of gravity, without requiring a signal source floatation device. The desired lateral component may be of a magnitude sufficient to maintain a desired lateral displacement of the towed signal source relative to a towing vessel. Flow proceeds to block 620.

At block 620, an orientation of the wing is adjusted to achieve the desired lateral component and desired vertical component. For example, a control system may rotate or slide wing 310 in order to adjust its orientation. As another example, a control system may alter the orientation of one or more wing sections of the wing. In one embodiment, the lateral component and vertical component may be further controlled by adjusting a velocity of the towing vessel. Further, a control system may adjust the effective tow point of a signal source module in order to alter than lateral and/or vertical force components imparted by the wing as it is towed through a body of water. Flow ends at block 620.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a signal source;
   an intermediate structure, wherein the signal source is coupled to a bottom portion of the intermediate structure; and
   a wing coupled to a top portion of the intermediate structure and configured, when towed by a survey vessel through a body of water, to impart a force having lateral and vertical components that result from movement of the wing through the body of water;
wherein the wing includes a plurality of wing sections, wherein at least one of the plurality of wing sections is configured to separately rotate about a pivot point that couples the at least one of the wing sections to the intermediate structure.

2. The apparatus of claim 1, wherein the intermediate structure comprises a keel.

3. The apparatus of claim 1, further comprising at least one actuator coupled to the wing and the intermediate structure, wherein the at least one actuator is operable to move the wing relative to the intermediate structure.

4. The apparatus of claim 3, wherein the at least one actuator is a circular actuator located at the pivot point and configured to rotate the at least one of the plurality of wing sections about the pivot point.

5. The apparatus of claim 3, wherein the at least one actuator is a linear actuator coupled to push or pull the wing so that the at least one of the plurality of wing sections rotates about the pivot point.

6. The apparatus of claim 1, further comprising a coupling point adapted to be coupled to a towing cable, wherein a position of the coupling point is adjustable in response to a control signal.

7. The apparatus of claim 1, wherein the signal source comprises one or more acoustic or electromagnetic sources.

8. The apparatus of claim 1, wherein the signal source comprises one or more air guns.

9. The apparatus of claim 1, wherein the wing is coupled to the intermediate structure via a second pivot point, and wherein the wing is configured to rotate about the second pivot point in order to alter the lateral component of the force when towed through the body of water.

10. The apparatus of claim 1, wherein one or more of the plurality of wing sections is configured to slide along the intermediate structure.

11. The apparatus of claim 1, wherein the signal source is not coupled to a signal source floatation device, and wherein the vertical component of the force is sufficient to maintain the signal source at a specified depth.

12. A method comprising:
towing a signal source through a body of water, wherein the signal source is coupled to a wing via an intermediate structure; and
imparting a force to the signal source with the wing, wherein the force includes a lateral component and a vertical component;
wherein the wing includes a plurality of wing sections, wherein at least one of the plurality of wing sections is configured to separately rotate about a pivot point that couples the wing to the intermediate structure.

13. The method of claim 12,
wherein the wing includes a forward wing section, a middle wing section, and an aft wing section;
wherein the forward and aft wing sections are rotatable relative to the intermediate structure; and
wherein the middle wing section is fixed relative to the intermediate structure.

14. The method of claim 12, wherein the intermediate structure is a keel.

15. The method of claim 12, wherein imparting the force comprises using at least one of (1) a buoyant force acting on the wing in the body of water, and (2) water pressure caused by movement of the wing through the body of water.

16. The method of claim 12, wherein imparting the force comprises using both (1) a buoyant force acting on the wing in the body of water, and (2) water pressure caused by movement of the wing through the body of water.

17. The method of claim 12, wherein at least a majority of a top surface of the wing is oriented within 20 degrees of parallel to a surface of the body of water, and wherein a line passing through a longest direction of the wing is within 20 degrees of parallel to a centerline of the intermediate structure.

18. The method of claim 12, further comprising maintaining the signal source at a specified depth, wherein the signal source is not coupled to a signal source floatation device.

19. The method of claim 12, further comprising:
using a tow cable to tow the signal source from a survey vessel; and
using the lateral component of the force to maintain the signal source at a lateral displacement of at least 280 meters from a tow point on the survey vessel.

20. The method of claim 12, further comprising:
using a tow cable to tow the signal source from a survey vessel; and
using the lateral component of the force to maintain the signal source at a lateral displacement of at least one half of a deployed length of the tow cable.

21. The method of claim 12, further comprising:
towing the signal source from a survey vessel; and
adjusting an effective tow point of a tow cable coupling the signal source to the survey vessel.

22. The method of claim 12, further comprising:
determining a desired lateral component and a desired vertical component of the force; and
adjusting an orientation of the wing to achieve the desired lateral component and the desired vertical component.

23. The method of claim 22, wherein the adjusting includes rotating and/or sliding at least a portion of the wing.

24. The method of claim 22, wherein the adjusting includes separately rotating the at least one of the plurality of wing sections of the wing.

25. The method of claim 22, further comprising:
adjusting a velocity of a survey vessel towing the signal source to achieve the desired lateral component and desired vertical component.

26. An apparatus, comprising:
a signal source;
an intermediate structure, wherein the signal source is coupled to the intermediate structure; and
a wing coupled to the intermediate structure and configured, when towed by a survey vessel through a body of water, to impart a force having lateral and vertical components that result from movement of the wing through the body of water;
wherein the wing includes a plurality of wing sections, wherein at least one of the plurality of wing sections is configured to separately rotate about a pivot point that couples the at least one of the wing sections to the intermediate structure.

27. The apparatus of claim 26, wherein the intermediate structure comprises a keel.

28. The apparatus of claim 26, wherein the intermediate structure includes an actuator located at the pivot point and configured to rotate the at least one of the plurality of wing sections about the pivot point.

29. The apparatus of claim 26, wherein the signal source comprises one or more acoustic or electromagnetic sources.

30. The apparatus of claim 26, wherein the wing is coupled to the intermediate structure via a second pivot point, and wherein the wing is configured to rotate about the second pivot point in order to alter the lateral component of the force when towed through the body of water.

31. The apparatus of claim 26, wherein the signal source is not coupled to a signal source floatation device, and wherein the vertical component of the force is sufficient to maintain the signal source at a specified depth.

* * * * *